E. ARMSTRONG.

AXLE LUBRICATING DEVICE.

APPLICATION FILED DEC. 12, 1908.

Reissued Nov. 15, 1910. 13,167.

Witnesses:

John O. Gampfer

Ernest Armstrong

Inventor

By his Attorneys

Kenyon & Kenyon

THE NORRIS PETERS CO., WASHINGTON, D.

UNITED STATES PATENT OFFICE.

ERNEST ARMSTRONG, OF CAMDEN, NEW JERSEY, ASSIGNOR, BY MESNE ASSIGNMENTS, TO JOURNAL LUBRICATOR COMPANY, OF NEW YORK, N. Y., A CORPORATION OF NEW YORK.

AXLE-LUBRICATING DEVICE.

13,167. Specification of Reissued Letters Patent. Reissued Nov. 15, 1910.

Original No. 872,984, dated December 3, 1907, Serial No. 360,305. Application for reissue filed December 12, 1908. Serial No. 467,319.

*To all whom it may concern:*

Be it known that I, ERNEST ARMSTRONG, a citizen of the United States of America, residing in Camden, county of Camden, State of New Jersey, have invented a certain new and useful Improvement in Axle-Lubricating Devices, of which the following is a true and exact description, reference being had to the accompanying drawings, which form a part thereof.

My invention relates to mechanism for lubricating axles, particularly car axles, and has for its object to provide an efficient oiling device with the minimum consumption of oil and the least possible wear on the oiling parts.

I employ a wick oiling swab, the lower part of which, and preferably, auxiliary wicks attached to which, are immersed in oil lying in the bottom of the axle box, and broadly speaking, the leading feature of my invention consists in supporting the ends of this wick oiler in the box at points above the center of the axle and out of contact with the axle, said points being so located that intermediate portions of the wick are drawn by gravity only into contact with the axle.

Another important feature of my invention consists in the employment of a wick supporting frame to which the ends of the wick oiler are attached, the frame being secured in proper position in the box by being clamped between the top of the axle bearing and the wedge or other part supporting this bearing in position. By preference the wick supporting device is made of thin sheet metal and provided with flanges which will engage shoulders occupying normally fixed positions in the box and thus prevent longitudinal movement of the frame and the wick supported thereon.

The above and other detailed features of my improvement will be best understood as described in connection with the drawings in which they are illustrated and in which—

Figure 1:
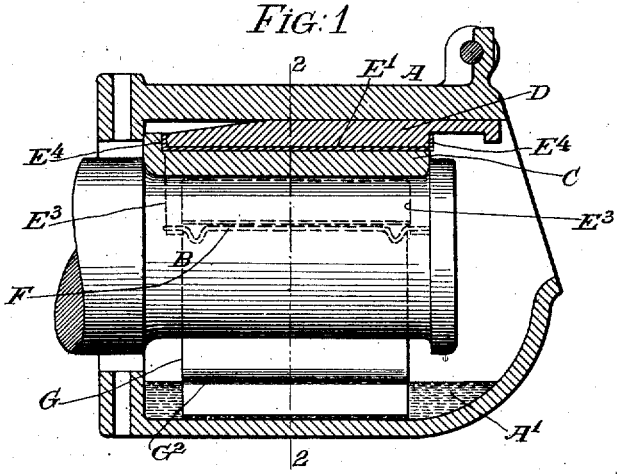
Figure 2:
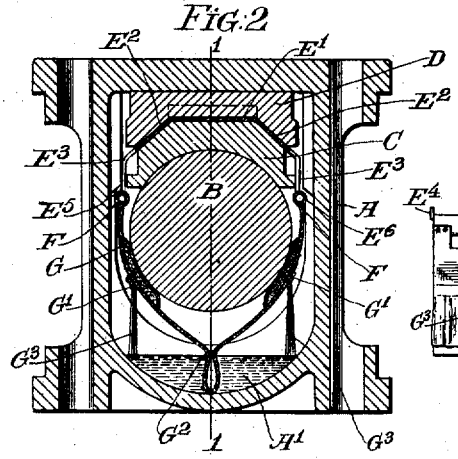
Figure 4:
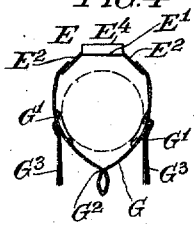
Figure 3:
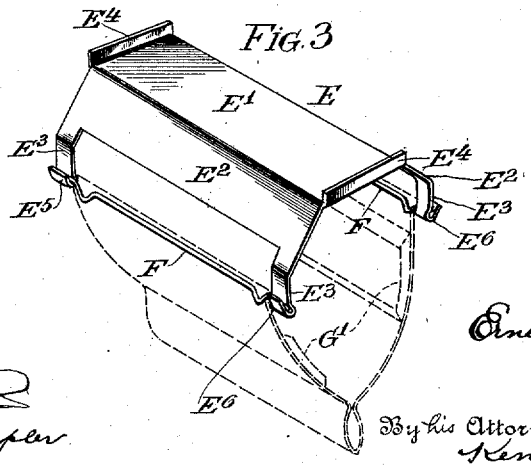

Figure 1 is a side view of an axle box provided with my improvements in what I believe to be their best form, the view being shown on the vertical section line 1—1 of Fig. 2. Fig. 2, is a cross section through the box on the line 2—2 of Fig. 1. Fig. 3 is a perspective view of the wick supporting device shown in connection with Figs. 1 and 2, with the wick oiler indicated in dotted lines. Fig. 4, is an end view of a somewhat modified form of wick oiler support with the wick attached, and Fig. 5 a side elevation of the device shown in Fig. 4.

A, indicates the axle box which is of ordinary construction, having a chamber $A^1$ to hold a body of oil.

B is the axle; C the usual "brass" or bearing for the axle; D the usual "wedge" which intervenes between the bearing and the top of the axle box.

E is the wick oiler supporting device, preferably made of thin sheet metal conformed to the shape of the top of the bearing C so as to fit between it and the wedge or other device against which it rests.

The bearing surfaces of the wick holder are indicated at E $E^1$ $E^2$ $E^2$ and to prevent longitudinal movement of the holder I form it with one or more projecting flanges, as indicated at $E^4$, $E^4$, these flanges engaging against shoulders which normally occupy a fixed position in the box. Thus, as shown, the one flange extends up between the upturned flange of the bearing C, and the end of the wedge D, while the other flange rests against a shoulder formed near the other end of the wedge.

In the preferred form of holder shown in Fig. 3, lugs $E^3$ $E^3$ etc., extend downward from the corners of the holder and when in operative position, down along the opposite sides of the bearing C, and said lugs $E^3$ have their ends bent to form eyes, as indicated at $E^5$ $E^6$; one of these, by preference, as indicated at $E^6$ being formed by an elastic end of the upturned sheet metal which will permit the ready insertion and withdrawal of the wick supporting wire, such as F, which is supported in the eyes and directly supports one end of the wick as shown.

Figure 5:
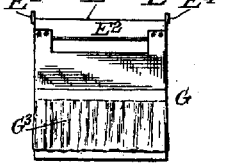

In the modified construction shown in Figs. 4 and 5, the ends of the wick are attached directly to the outer edges of the surfaces $E^2$ $E^2$.

The points of support for the ends of the wick should in all cases be above the center of the axle and out of contact with the axle.

G is the wick oiler, preferably formed with pads $G^1$ $G^1$ where it is to come into contact with the axle and stitched together at $G^2$ so as to form a central depending wick extension. As shown, by preference also, the wick oiler is provided with auxiliary wicks, indicated at $G^3$ $G^3$ which also extend into the oil at the bottom of the box. The length of the wick oiler should be such that it will hang suspended between the supporting devices to which its ends are attached and so that intermediate points thus provided with the swabs $G^1$ $G^1$ will be drawn by gravity into contact with the sides of the axle. The light gravitative contact of the wick oiler with the axle I have found to give sufficient lubrication while at the same time the pressure against the axle is so light that there is little or no wear on the contacting parts of the wick oiler. As a result I have secured great advantages both in economy of lubrication and durability of the parts while at the same time there is practically nothing in the constructive details of my mechanism which is at all liable to become broken or get out of order.

It is well known that the motion of a car brings about a pressure on the wick or packing of the axle box which tends to move it in the opposite direction to that in which the car moves. It is therefore not absolutely necessary that the wick should contact with the axle when the car is at rest because if it hangs in close proximity to the axle it will be brought in contact with it as soon as the car is in motion.

I have described my invention in what I believe to be its most practicable and efficient form, but it is capable of useful application in modified forms which will occur to those familiar with the art. The essential and indispensable feature of my invention lies in the support of a wick above the center of the axle and in such location that an intermediate depending portion of the wick will lie close to or in light gravitative contact with the axle.

Having now described my invention, what I claim as new and desire to secure by Letters Patent is,

1. In combination with an axle box and an axle supported therein, a wick oiler having its ends supported in the box out of contact with the axle above the center thereof, and one on each side thereof, and its intermediate part forming a loop extending below the axle as described, and so as to contact lightly with the sides thereof by gravity.

2. In combination with an axle box and an axle supported therein, a wick oiler having its ends supported in the box out of contact with the axle above the center thereof, and one on each side thereof, and its intermediate part forming a loop extending below the axle as described, said wick oiler having swab pads attached to it at points adapted to contact with the sides of the axle, and said loop causing the wick oiler to contact lightly with the sides of the axle by gravity.

3. In combination with an axle box and an axle supported therein, a wick oiler having its ends supported in the box out of contact with the axle above the center thereof, and one on each side thereof, and its intermediate part forming a loop extending below the axle as described, said wick oiler having swab pads attached to it at points adapted to contact with the sides of the axle, and said loop causing the wick oiler to contact lightly with the sides of the axle by gravity, and auxiliary wicks depending from said swab pads.

4. In combination with an axle box and an axle supported therein, a wick oiler having its ends supported in the box out of contact with the axle above the center thereof, and one on each side thereof, and its intermediate part forming a loop extending below the axle as described, and so as to contact lightly with the sides thereof by gravity, and auxiliary wicks depending from the sides of said looped wick.

5. In combination with an axle box and an axle supported therein, a wick oiler having its ends supported in the box above the center of the axle and one on each side of the same, and the intermediate part of the oiler forming a loop extending below the axle as described, and so as to contact lightly with the sides thereof by gravity.

6. In combination with an axle box and an axle journal therein, a bearing a separate wick supporting frame extending over the bearing from one side thereof to the other, and a wick oiler supported at each end on said frame and arranged to extend beneath the axle.

7. In combination with an axle box and an axle bearing in the upper side thereof, a wick supporting frame of thin sheet metal extending over the bearing from one side thereof to the other, and a wick oiler supported at each end on said frame and arranged to extend beneath the axle.

8. In combination with an axle box and an axle bearing in the upper side thereof, a wick supporting frame of thin sheet metal having upwardly turned flanges adapted to fit against shoulders occupying a normally fixed position in the box, extending over the bearing, and a wick oiler supported at each end on said frame and arranged to extend beneath the axle.

9. In combination with an axle box, a bearing supported therein, and an axle contacting with the bearing, a sheet metal wick support conformed to the shape of the top of the bearing and fitting between the same and the surface against which it rests.

10. In combination with an axle box, a bearing supported therein, and an axle contacting with the bearing, a sheet metal wick support conformed to the shape of the top of the bearing and fitting between the same and the surface against which it rests, said support having flanges adapted to fit against a shoulder or shoulders occupying normally a fixed position in the box.

11. In combination with an axle box, a bearing supported therein, and an axle contacting with the bearing, a sheet metal wick support conformed to the shape of the top of the bearing, and fitting between the same and the surface against which it rests, and wick supporting rods detachably secured to the ends of the sheet metal support.

12. In combination with an axle and an axle box, a journal bearing in said box for the axle and resting upon the same, a frame extending over said bearing, a wick oiler having its ends supported by said frame out of contact with and above the center of the axle, and one on each side of the same, and its intermediate part forming a loop extending below the axle as described, and so as to contact lightly with the sides thereof by gravity.

13. In combination with an axle and an axle box, a journal bearing in said box for the axle and resting upon the same, a frame extending over said bearing and conforming to the top of the same, a wick oiler having its ends supported by said frame out of contact with and above the center of the axle, and one on each side of the same, and its intermediate part forming a loop extending below the axle as described, and so as to contact lightly with the sides thereof by gravity.

14. In combination with an axle and an axle box, a journal bearing in said box for the axle and resting upon the same, a frame extending over and down the sides of said bearing, a wick oiler having its ends supported by said downward extensions of the frame, and out of contact with and above the center of the axle, and one on each side of the same, and its intermediate part forming a loop extending below the axle as described and so as to contact lightly with the sides thereof by gravity.

15. In combination with an axle and an axle box, a journal bearing in said box for the axle and resting upon the same, a frame extending over said bearing and conforming to the top of the same, a wick oiler having its ends supported by said frame out of contact with and above the center of the axle, and one on each side of the same, and its intermediate part forming a loop extending below the axle as described, said oiler having swab pads attached to it at points adapted to contact with the sides of the axle.

16. In combination with an axle and an axle box, a journal bearing in said box for the axle and resting upon the same, a frame extending over and down the sides of said bearing, a wick oiler having its ends supported by said downward extensions of the frame and out of contact with and above the center of the axle, and one on each side of the same, and its intermediate part forming a loop extending below the axle as described, and said oiler having swab pads attached to it at points adapted to contact with the sides of the axle.

ERNEST ARMSTRONG.

Witnesses:
EDWIN SEGER,
PENNINGTON HALSTED.